April 1, 1930.  W. RUTHVEN  1,752,507
SHAPING TOOL
Filed Oct. 15, 1926
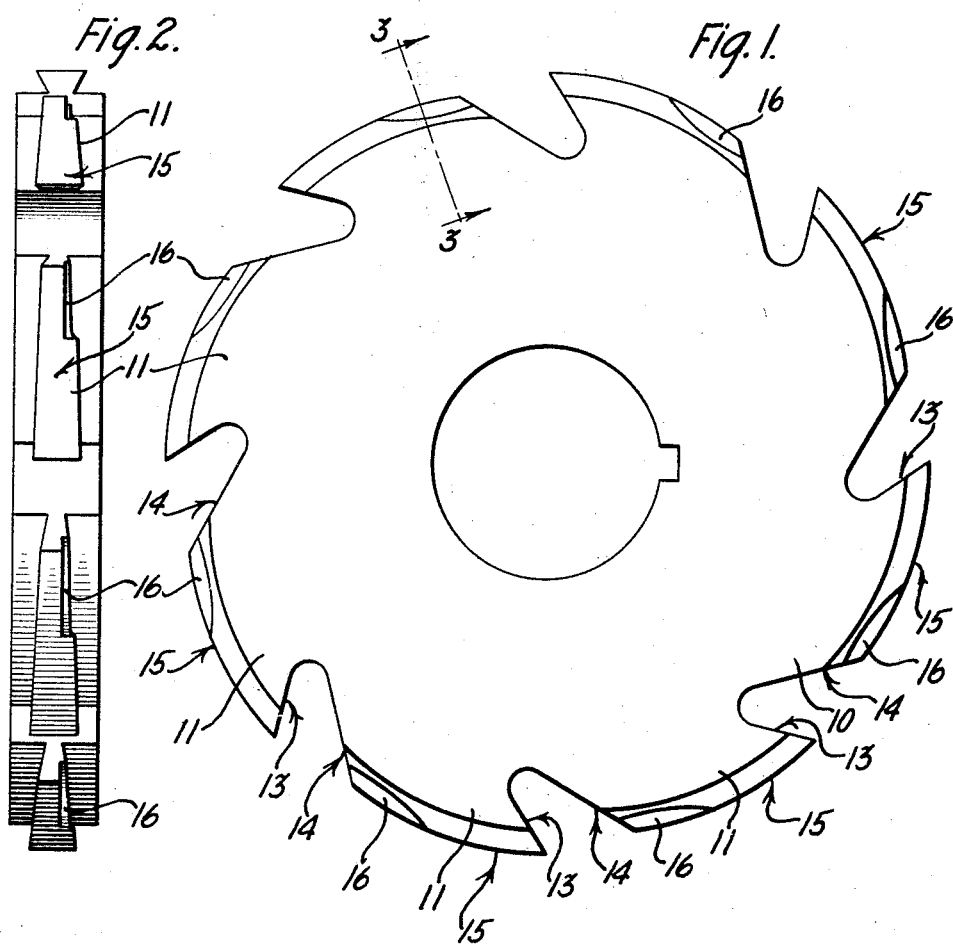
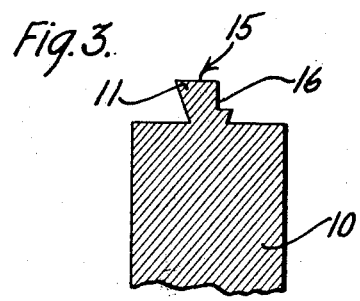
Inventor
William Ruthven
by J. A. Patterson Att'y Patented Apr. 1, 1930

1,752,507

UNITED STATES PATENT OFFICE

WILLIAM RUTHVEN, OF CHICAGO, ILLINOIS, ASSIGNOR TO WESTERN ELECTRIC COMPANY, INCORPORATED, OF NEW YORK, N. Y., A CORPORATION OF NEW YORK

SHAPING TOOL

Application filed October 15, 1926. Serial No. 141,708.

This invention relates to shaping tools, and more particularly to rotary cutters for milling machines and the like.

Various types of tools employed for cutting and shaping materials must, in some instances, be repeatedly sharpened by grinding away portions of the tool surface. Obviously, this results in the gradual reduction in the tool stock and when the stock has been reduced to a thickness below which it might be unsafe for further subjection of the tool to normal cutting operations, the use thereof should be immediately discontinued. Thus, for example, forming or shaping milling machine cutters must be repeatedly sharpened by grinding away the front surfaces of the cutter teeth and consequently the effective strength of the individual teeth is gradually decreased. If such a cutter is subjected to normal operating conditions after the stock of the individual teeth has been reduced to an unsafe degree, it becomes potentially hazardous to the machine operator and this fact is particularly evident in instances where cutters are operated at high speeds as in the practice of woodworking.

The primary object of this invention is to provide a shaping tool having a simple and effective means for positively preventing the use thereof when the tool stock has been reduced to an unsafe degree.

In accordance with the general features of the invention, one embodiment thereof comprises a shaping cutter having a plurality of peripheral teeth, the cutting or working surfaces of which are provided with a definite shaping contour. A notch or groove formed in each tooth renders a section of the working surface thereof imperfect and this imperfection or alteration extends over that portion of the working surface or contour which corresponds to and designates a tooth dimension below which the effective strength of the tooth would be dangerously impaired. Repeated sharpening reduces the stock of the cutter teeth and when the stock is reduced to an unsafe degree the notches will render impossible the production of a properly shaped cut in the work. The imperfection thus produced in the work serves as a visible indication to the operator that the tooth thickness has been reduced to an unsafe degree and that the use of the cutter should be discontinued.

These and other objects will be apparent from the following detailed description and the accompanying drawing, wherein Fig. 1 is an elevational view of a milling cutter disclosing one embodiment of the invention;

Fig. 2 is an elevational view of the cutter viewed from the left of Fig. 1, and

Fig. 3 is a fragmentary detailed sectional view of one of the cutter teeth taken on the line 3—3 of Fig. 1.

Referring now to the drawing wherein like numerals have been employed to designate similar parts throughout the various figures, it will be observed that Figs. 1 and 2 disclose a conventional milling cutter which comprises a body portion 10 and a plurality of peripheral cutter teeth 11 formed thereon. Each tooth 11 has a front and rear surface 13 and 14, respectively, and extending between each of these surfaces is a working surface or shaping contour 15.

In use, the cutter teeth 11 may be sharpened by grinding the front surface 13 and obviously upon repeated sharpening the thickness of the tooth stock will be gradually reduced. A notch or recess 16 is provided in each tooth which presents a mutilation or imperfection in the working surface thereof. The notches 16 are comparatively small so as not to impair the effective strength of the teeth, and when the cutter faces 13 have receded to the notch 16 due to the repeated grinding of the teeth, an imperfection in the work produced by the cutter will be clearly evident to the operator. The recess or imperfection 16 is so positioned that the point where it begins on the working surface 15 marks the limit to which the cutter teeth should be ground. In other words, when the cutter has been resharpened to the point where the notch 16 begins, the stock of the individual teeth will have been reduced to such an extent that further reduction thereof would render the cutter unsafe.

By having a cutter constructed in the manner described, a machine operator is positively apprised of the condition of the cutter teeth and if an attempt is made to continue to use the cutter after the tooth has been worn back to the place indicated by the notches 16, it will be impossible to produce a properly shaped cut in the work and hence the use of an unsafe cutter is prevented. The hazards incident to the use of cutters after the teeth have been reduced to an unsafe degree will be more apparent when considered in connection with machines which operate at high speed. In any instance the potential hazards will increase as the speed of the cutter increases.

This invention has been described in connection with one type of shaping tool, but obviously the invention lends itself to many other forms of shaping tools having working surfaces capable of being altered or recessed in various ways without departing from the spirit and scope of this invention and the invention therefore should be limited only by the scope of the appended claims.

What is claimed is:

1. In a shaping tool, a rotary cutter having a plurality of peripheral teeth, each of the teeth having similar continuous working surfaces extending between the front and rear portions thereof, a portion of the working surface of each tooth being similarly mutilated at a point which marks the minimum safe extent to which the stock of the individual tooth may be reduced upon sharpening.

2. In a shaping tool, a rotary cutter having a plurality of peripheral teeth, each of the teeth having similar continuous working surfaces extending between the front and rear portions thereof, a portion of the working surface of one tooth having an imperfection for rendering the tool ineffective when the stock of the teeth has been reduced to a predetermined extent.

3. In a shaping tool, a rotary cutter having a plurality of peripheral teeth, each tooth formed along its length of normal working portion of substantially the same cross-section for providing similar contours in the work, and a contiguous abnormal working portion of different cross-section to prevent the use of the tool for normal work when the normal working portion has been removed.

In witness whereof, I hereunto subscribe my name this 30th day of September, A. D. 1926.

WILLIAM RUTHVEN.